US008958644B2

(12) United States Patent
Schwartz et al.

(10) Patent No.: US 8,958,644 B2
(45) Date of Patent: Feb. 17, 2015

(54) CREATING TABLES WITH HANDWRITING IMAGES, SYMBOLIC REPRESENTATIONS AND MEDIA IMAGES FROM FORMS

(71) Applicants: Edward L. Schwartz, Menlo Park, CA (US); John W. Barrus, Menlo Park, CA (US)

(72) Inventors: Edward L. Schwartz, Menlo Park, CA (US); John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 0 days.

(21) Appl. No.: 13/781,720

(22) Filed: Feb. 28, 2013

(65) Prior Publication Data

US 2014/0245120 A1    Aug. 28, 2014

(51) Int. Cl.
*G06K 9/00* (2006.01)
*G06K 9/46* (2006.01)
*G06F 17/00* (2006.01)
*G06F 17/24* (2006.01)
*G06K 9/72* (2006.01)

(52) U.S. Cl.
CPC ............... *G06F 17/243* (2013.01); *G06K 9/72* (2013.01); *G06K 9/00402* (2013.01); *G06K 9/00449* (2013.01)

USPC ............ 382/181; 382/187; 382/190; 715/222

(58) Field of Classification Search
USPC ......... 382/181, 224, 186, 173, 177, 187, 202, 382/190, 195, 225; 715/200, 221, 222, 223; 345/418, 440
See application file for complete search history.

(56) References Cited

U.S. PATENT DOCUMENTS

| 5,953,451 | A  | * | 9/1999  | Syeda-Mahmood | 382/187 |
| 7,630,962 | B2 | * | 12/2009 | Napper et al. | 1/1     |
| 8,077,973 | B2 | * | 12/2011 | Dong          | 382/186 |
| 8,175,389 | B2 | * | 5/2012  | Matic et al.  | 382/187 |
| 8,792,730 | B2 | * | 7/2014  | Barrus        | 382/224 |

* cited by examiner

*Primary Examiner* — Sheela Chawan
(74) *Attorney, Agent, or Firm* — Patent Law Works LLP

(57) ABSTRACT

A system and method for creating a table from one or more form images is described. An Image Based Document Management (IBDM) server includes a stroke identification module, an image generator, a table generator and a preference module. The stroke identification module receives completed form data from one or more forms with handwriting fields, media fields and symbolic fields. The image generator generates field images that are a combination of handwriting fields, media fields and symbolic fields. The user preference module determines a user preference for displaying the table. The table generator generates a table from the field images based on the user preference.

20 Claims, 11 Drawing Sheets

300

XYZ  Visitor Registration

Date:
7/1/2013

301
Name:
Oscar Mike
303

Company Name:
PQR
307

To See:
Leonardo

Email Address *(tap field below to input using soft keyboard)*:
oscar.mike@pqr.com

*For U.S. Export Compliance purpose we ask that you indicate your nationality:*
309
○ *U.S. Citizen or Permanent Resident*

● *Foreign National:*

Name of Country: Canada

Signature: ~~~~

305
PRIORITY —311

*Thank you for visiting XYZ company, inc.*

⭕ → Labels

▭ → Fields

Check box if you want us to contact you by phone
— 381
Phone number: 650-496-5700 — 383

Figure 3C

| Label | Image | Symbolic | |
|---|---|---|---|
| Date | 7/1/2013 | | |
| Name | Oscar Mike | Oscar Mike | Symbolic is added |
| Company Name | PQR | PQR | |
| To see | Leonardo | Leonardo | |
| Name of Country | | | |
| Signature | | | |
| Photo | | | Image only |
| Email | mike@pqr.com | mike@pqr.com | |
| Other | ● | Other | |
| US | | | |
| Original Date | | 1/7/2013 01:00:24 PM | |
| Last Stroke Date | | 1/7/2013 01:02:10 PM | |
| First Stroke Date | | 1/7/2013 12:59:15 PM | Symbolic only |
| Median Stroke Date | | 1/7/2013 01:01:35 PM | |
| User Name | | 24254 | |
| User ID | | Joe | |

CREATING TABLES WITH HANDWRITING IMAGES, SYMBOLIC REPRESENTATIONS AND MEDIA IMAGES FROM FORMS

BACKGROUND OF THE INVENTION

1. Field of the Invention

The specification relates to a system and method for creating a table from one or more form images. In particular, the specification relates to creating a table with cells including handwriting strokes and symbolic representations of the handwriting strokes.

2. Description of the Background Art

Portable computing devices can be used to input information into forms. Users will input information using a stylus and the form will be converted entirely into symbolic information including the stroke information using optical character recognition (OCR), intelligent character recognition (ICR), or optical mark recognition (OMR) and stored for processing. However, the symbolic conversion is error prone, particularly for handwritten stroke information and often requires expensive human intervention to correct recognition errors while demanding computing resources that could be used in other ways. Furthermore, symbolic conversions of sensitive information on the forms can be a privacy concern for users accessing the form processing system and symbolic conversions of user signatures are unnecessary and energy intensive.

SUMMARY OF THE INVENTION

The disclosure overcomes the deficiencies of the prior art with a system and method for creating a table from form images where cells include handwriting strokes and symbolic representation of handwriting strokes. An Image Based Document Management (IBDM) server includes a stroke identification module, a form field identification module, an image generator, a table generator, a symbolic representation module and a preference module. In one embodiment, the stroke identification module receives a plurality of form images with handwriting strokes in handwriting fields, media in media fields and symbolic values associated with symbolic fields. The image generator generates field images that are a combination of the symbolic fields, the media fields and the handwriting fields. The table generator generates a table with the field images including one or more columns comprising a first field image including both the media field and the handwriting field, a second field image including symbolic representation of handwriting data, a third field image including the handwriting data and a fourth field image including the symbolic value of symbolic fields. The table generator stores the handwriting data and the symbolic representations as being associated with the second field image. The user preference module determines a user preference for displaying the table, the user preference being for field images including the handwriting data or field images including the symbolic representations. In one embodiment, the table generator generates the table based on the user preference.

Other aspects include corresponding methods, systems, apparatuses, and computer program products for these and other innovative aspects.

This results in form processing that is less computationally expensive and faster processing. The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

FIG. 3A is a graphic representation of an example form.

FIG. 3C is a graphic representation of a form image including handwriting strokes that are received by the Image Based Document Management server.

FIG. 4B is a graphic representation of an embodiment of a user interface that includes a tabular editing window for editing symbolic data for a single form.

FIG. 4C is a graphic representation of an embodiment of a user interface that includes a table with a plurality of form images based on a preference set for field images including symbolic representation.

DETAILED DESCRIPTION OF THE PREFERRED EMBODIMENTS

Figure 1:
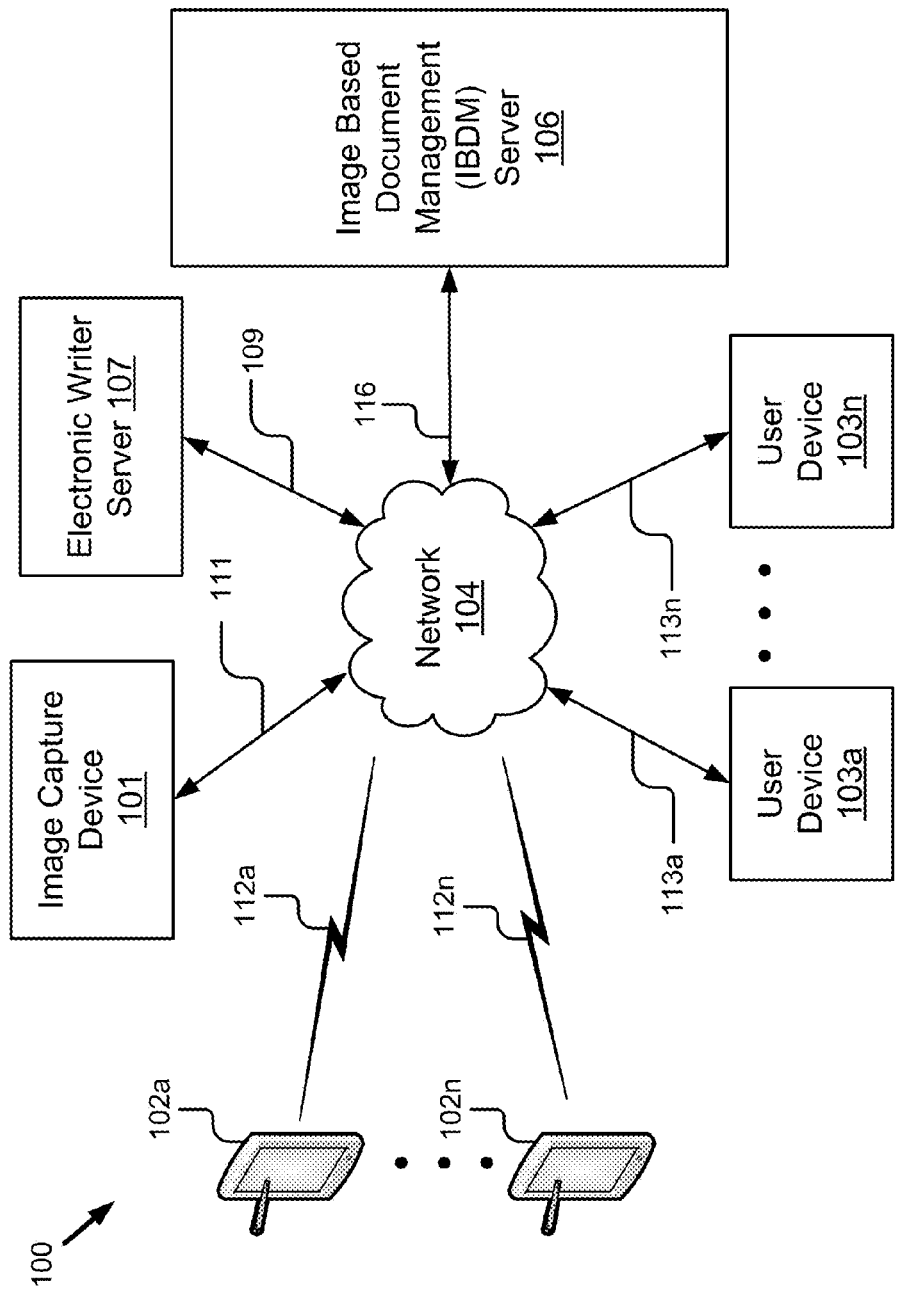
FIG. 1 is a high-level block diagram illustrating one embodiment of a system for creating tables from a plurality of form images.

A description of a system and method for creating a table from form images with cells of the table including handwriting strokes and symbolic representations of the handwriting strokes follows. For purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a high-level block diagram of a system 100 for creating tables from a plurality of form images. The illustrated embodiment of the system 100 comprises: an image capture device 101, portable computing devices 102a-102n, user devices 103a-103n, an electronic writer server 107 and an Image Based Document Management (IBDM) server 106 that are each communicatively coupled to the network 104. In FIG. 1 and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, wireless application protocol (WAP), email, etc. While only one network 104 is coupled to the plurality of portable computing devices 102a-102n, the plurality of user devices 103a-103n, the electronic writer server 107 and the Image Based Document Management (IBDM) server 106, in practice any number of networks 104 can be connected to the entities.

The image capture device 101 is coupled to the network 104 via signal line 111. Although only one image capture device 101 is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the electronic writer server 107. In one embodiment, the image capture device 101 also sends an unmarked printed form image (i.e., an image of the printed form without any strokes) as metadata along with the captured image to the electronic writer server 107. The image capture device 101 is, for example, a scanner, a digital camera, a standard cellular camera phone, a webcam, a video recorder, etc.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated form images to the electronic writer server 107. A form is any document that includes fields (i.e., blank spaces) for insertion of required or requested information. The form when filled out with the requested information may be a statement, an order, a request, etc. For example, a form can be a tax form, an insurance form, a medical form, an electronic check, a job application, a survey, a receipt, etc.

In one embodiment, the portable computing device 102 is a tablet computer including a computing pad and a stylus. The computing pad is adapted to display a form image and capture any strokes written on the form image using the stylus or the user's fingertip. The strokes are typically displayed on top of the image, just as if written by pen on paper. The computing pad usually captures the strokes as a sequence of points or segments along with location, timing and pressure information. The computing pad sends the form images including the captured strokes in any image format known to persons of ordinary skill in the art, for example, scalable vector graphics (SVG) file format, which can contain both strokes and images. In one embodiment, the computing pad attaches the information associated with the strokes, for example, the location, the pressure profiles and timing information with the form images as metadata. The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database. For determining the portable computing device's 102 location indoors, the portable computing device 102 employs radio frequency, ultra-sound signal or invisible light communication. For example, the portable computing device 102 determines its location through wireless access points based on measuring the intensity of received signals. In one embodiment, the captured strokes are saved in a stroke format known to any person of ordinary skill in the art, including SVG or Ink Markup Language (InkML).

The user devices 103a-103n are each coupled to the network 104 via the signal lines 113a-113n respectively. The user device 103 is any computing device that includes a memory and a processor, for example, a desktop computer, a laptop computer, etc. The user device 103 is adapted to send and receive data to and from the IBDM server 106. For example, the user device 103 sends a request to view a table in the table to the IBDM server 106 and the IBDM server 106 provides data in JavaScript Object Notation (JSON) and PNG format to the user device 103. The user device 103 is accessed by users that have permission to access information from the IBDM server 106, such as a creator of the form sent to portable computing devices 102 or an administrator of the IBDM server 106. The user device 103 includes a display for viewing information provided by the IBDM server 106. For example, the user device 103 receives graphical data from the IBDM server 106 for viewing details of multiple form images in a spreadsheet-like table view and/or in a summary view on the display of the user device 103.

The electronic writer server 107 is any computing device including a memory and a processor which is coupled to the network 104 via signal line 109. In one embodiment, the electronic writer server 107 generates one or more types of form images for a user to complete. For example, the electronic writer server 107 may generate forms relating to visitor registration, patient medical history, bank enrollment, etc. including different formats, such as, PDF, PNG, JPEG, etc. In another embodiment, the electronic writer server 107 receives an unmarked blank form image from the image capture device 101. The electronic writer server 107 comprises software (not shown) that specifies the coordinates of form fields, labels of individual fields and labels of groups of fields in the form image. In one embodiment, the electronic writer server 107 generates a field identifier for each identified field and a label identifier for each identified label in the one or more types of forms. The one or more types of forms are assigned form identifiers. The electronic writer server 107 provides the blank form image and metadata describing the identity and the location of fields, labels, images and/or symbolic text for labels on the blank form image to the IBDM server 106.

In one embodiment, the electronic writer server 107 receives form images that are filled out with handwriting strokes and attached with one or more types of media from the plurality of portable computing devices 102a-102n. The electronic writer server 107 collects the form images, handwriting strokes and media associated with the form images for delivering to the IBDM server 106. Although only one electronic writer server 107 is illustrated, persons with ordinary skill in the art will recognize that any number of electronic writer servers 107 can be coupled to the network 104. In another embodiment, the portable computing devices 102a-102n transmit the completed forms directly to the IBDM server 106.

The IBDM server 106 is any computing device including a memory and a processor which is coupled to the network 104 via signal line 116. In one embodiment, the IBDM server 106 receives form images including handwriting strokes from the electronic writer server 107, automatically identifies fields and labels in each of the form images, generates field images for the identified fields and stores the field images and associated metadata in the data storage 250. In one embodiment, the IBDM server 106 creates a table from the received form images and modifies a view of the table based on a user preference. Although only one IBDM server 106 is illustrated, persons with ordinary skill in the art will recognize that any number of IBDM servers 106 can be coupled to the network 104. In one embodiment, the components of the IBDM server 106 could be part of a user device 103 instead of being part of a server. The IBDM server 106 is described in further detail below with reference to FIG. 2.

Image Based Document Management (IBDM) Server 106

Figure 2:
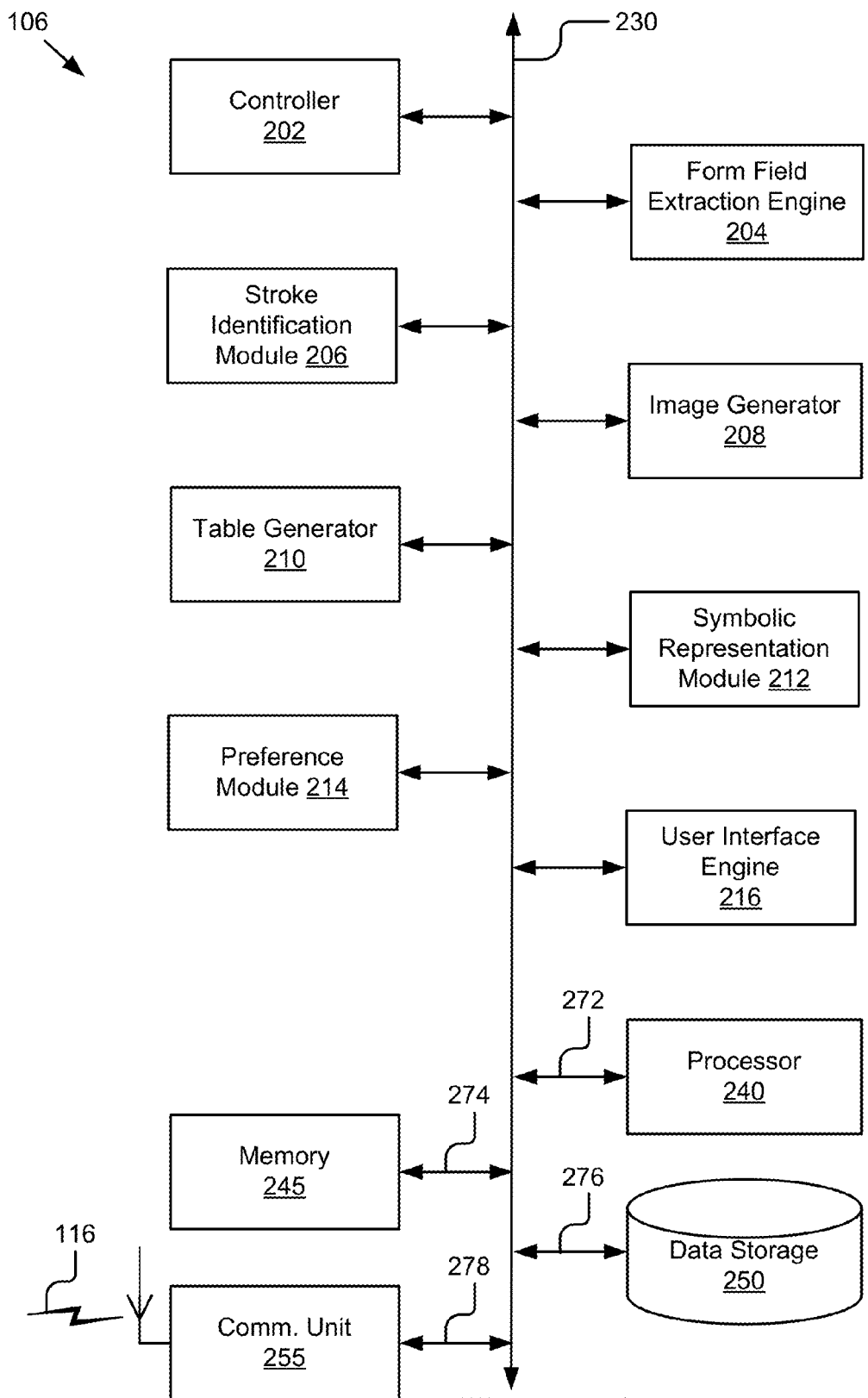
FIG. 2 is a block diagram illustrating one embodiment of an Image Based Document Management (IBDM) server in more detail.

Referring now to FIG. 2, the Image Based Document Management Server (IBDM) server 106 is shown in more detail. FIG. 2 is a block diagram of the IBDM server 106 that includes a controller 202, a form field extraction engine 204, a stroke identification module 206, an image generator 208, a table generator 210, a symbolic representation module 212, a preference module 214, a user interface engine 216, a processor 240, a memory 245, a communication unit 255 and data storage 250.

The processor 240, the memory 245, the communication unit 255 and the data storage 250 are communicatively coupled to the bus 230. The bus 230 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations. The processor 240 is coupled to the bus 230 for communication with the other components of the IBDM server 106 via signal line 272. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 230 for communication with the other components of the IBDM server 106 via signal line 274. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 255 is hardware for receiving and transmitting data by linking the processor 240 to the network 104 and other processing systems. The communication unit 255 receives data such as requests from the user device 103 and transmits the requests to the table generator 210, for example a request for viewing a table. The communication unit 255 also receives information, such as form images, from the electronic writer server 107. The communication unit 255 transmits information including table to the user device 103 for display, for example, in response to a request. The communication unit 255 is coupled to the bus 230 via signal line 278. In one embodiment, the communication unit 255 includes a port for direct physical connection to the user device 103, the portable computing device 102 or to another communication channel. For example, the communication unit 255 includes an RJ45 port or similar port for wired communication with the user device 103. In another embodiment, the communication unit 255 includes a wireless transceiver 116 for exchanging data with the user device 103, the portable computing device 102 or any other communication channel using one or more wireless communication methods, such as IEEE 802.11, IEEE 802.16, Bluetooth® or another suitable wireless communication method.

In yet another embodiment, the communication unit 255 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 255 includes a wired port and a wireless transceiver. The communication unit 255 also provides other conventional connections to the network 104 for distribution of files and/or media objects using standard network protocols such as TCP/IP, HTTP, HTTPS and SMTP as will be understood to those skilled in the art.

The data storage 250 is a non-transitory memory that stores information associated with a plurality of form images received from the electronic writer server 107. The data storage 250 is coupled to the bus 230 for communication with the other components via signal line 276. In one embodiment, the data storage 250 receives information from the electronic writer server 107 to store a blank form image and metadata describing the identity and the location of fields, labels, images and/or symbolic text for labels on the blank form image. In one embodiment, the data storage 250 receives information from the field extraction engine 204 that includes extracted information (e.g., drawing primitives, transform, line and fill color) and metadata associated with media fields and symbolic fields. In another embodiment, the data storage 250 stores the handwriting stroke data in compressed format, such as, InkML, SVG, PNG, etc. received from the stroke identification module 206.

In one embodiment, the data storage 250 receives information from the image generator 208 that includes field images of handwriting strokes, symbolic fields and media fields and metadata associated with the field images including stroke metadata for recreating strokes as field images, a form identifier, a field identifier, etc. The metadata also includes stroke information including a date and time that each stroke was input and the location of each stroke. Lastly, the metadata includes symbolic representation information associated with the field images that are subjected to OCR, OMR, ICR, etc. including confidence scores associated with the symbolic conversion. The metadata is used in the generation of a table, as will be described in more detail below.

The controller 202 is software and routines for receiving data via the communication unit 255, routing the data to the appropriate component and transmitting responses from components to the communication unit 255 for transmitting to the user device 103 and other components of the system 100. In one embodiment, the controller 202 is a set of instructions executable by the processor 240 to provide the functionality described below for managing data transfer between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 255, the form field extraction engine 204, the stroke identification module 206, the user interface engine 216 and other components of the IBDM server 106.

The form field extraction engine 204 is software and routines for extracting information associated with fields in one or more forms received from the electronic writer server 107 (or in some embodiments, directly from the portable computing devices 102). In one embodiment, the form field extraction engine 204 is a set of instructions executable by the processor 240 to provide the functionality described below for extracting information associated with fields from a form image. In another embodiment, the form field extraction engine 204 is stored in the memory 245 and is accessible and executable by the processor 240. In either embodiment, the field extraction engine 204 is adapted for cooperation and communication with the controller 202, the image generator 208, the data storage 250 and other components of the IBDM server 106.

In one embodiment, the form field extraction engine 204 extracts a background image from completed form data from one or more forms received from the electronic writer server 107 through the controller 202. The background image is used to identify a blank form image that corresponds to the one or more completed forms. In another embodiment, the background image is used to identify a "collection" of forms to add the one or more completed forms for purposes of organization. For example, a visitor may fill out a "visitor registration" form and that form image is added to a collection of visitor registration form images in the data storage 250.

FIG. 3A illustrates an example form 300 that includes a number of fields including a handwriting field 307, a symbolic field 309 and a media field 311. The fields have corresponding labels, such as, name, company name, signature, etc. Labels are illustrated with small dashes and fields are illustrated with longer dashes. A user fills in a field by inputting strokes inside the rectangular boxes (e.g., keying with a soft keyboard or writing with a stylus in cursive), selecting the radio buttons until activated (e.g., tick marks, "X" and solid circles) and marking strokes on top of a media field, for example, a photograph.

The completed form data for one or more forms include handwriting fields, symbolic fields and media fields. The handwriting fields include handwriting data, for example, writing, drawing and/or marking with strokes by a user. The symbolic fields include a graphical representation, for example, instructions for drawing a check box (e.g. drawing primitives, transforms, line and fill color, bitmaps) and include symbolic data, for example, a symbolic representation of a choice (e.g., a text phrase, such as, "True", "False", etc. beside a check box), timestamp metadata associated with the form (time and/or original date of fill out), timestamp metadata for stroke input (e.g., first stroke input time, median stroke input time, last stroke input time, etc.), location metadata where the form was submitted, etc. A symbolic field for choosing a product in one example has a graphical representation that is an image of the product and a symbolic value that is the model number for the product. A symbolic field in another example has a graphical representation that uses icons, logos or cartoons. The media fields include media data captured by a portable computing device 102 or media data saved on the storage of the portable computing device 102 that is used in the form, for example, a photograph, an icon that is linked to audio or video recording, etc. In one embodiment, the handwriting fields and the media fields can both appear at the same location on the completed form. For example, a user may mark strokes on top of a photograph in a form image.

Referring to the symbolic fields in the one or more completed forms, the form field extraction engine 204 in one embodiment extracts a line and fill color, a drawing primitive (for e.g., a square checkbox, a rectangular box for receiving handwriting strokes, "X" mark, ellipse, dotted line, etc.) and a transform used for drawing a graphical representation associated with the symbolic fields. In another embodiment, the form field extraction engine 204 extracts a symbolic value associated with the symbolic fields. For example, a text phrase indicating a choice beside a radio button, an email address entered by a user with a soft keyboard on a tablet into a text field, etc. In yet another embodiment, the form field extraction engine 204 extracts the timestamp and location associated with the form image. For example, the date of when the form was filled out, the location of where the form was filled out, a time of stroke input in the fields, etc. In one embodiment, the form field extraction engine 204 sends the extracted information from the symbolic fields to the image generator 208 and symbolic representation module 212. In another embodiment, the form field extraction engine 204 stores the extracted information in the data storage 250. The information extracted is stored in a structured and serialized data format known to any person of ordinary skill in the art, for example, JavaScript Object Notation (JSON).

Referring to the media fields in the one or more completed form, the form field extraction engine 204 in one embodiment extracts a transform used for drawing the graphical representation and a drawing primitive associated with the media fields. For example, the drawing primitive of the media fields can be the transform or geometric shape (e.g., coordinates of a rectangle) defining where media, such as, a photograph is placed. The other types of media extracted as a drawing primitive include an icon that is associated with an audio or video recording, a thumbnail, etc. In one embodiment, the form field extraction engine 204 sends the extracted information from the media fields to the image generator 208. In another embodiment, the form field extraction engine 204 stores the extracted information in the data storage 250.

In one embodiment, the form field extraction engine 204 uses the completed form data that corresponds to the one or more completed forms to extract the line and fill color, the drawing primitive and the transform used for drawing the graphical representation, etc. from the symbolic fields and the media fields. The extraction of handwriting strokes from the handwriting fields of the one or more completed forms is explained below with reference to the stroke identification module 206 in more detail.

The stroke identification module 206 is software and routines for identifying strokes associated with fields in a form image and extracting information used for drawing a graphical representation associated with handwriting fields. In one embodiment, the stroke identification module 206 is a set of instructions executable by the processor 240 to provide the functionality described below for identifying strokes associated with fields from a form image. In another embodiment, the stroke identification module 206 is stored in the memory 245 and is accessible and executable by the processor 240. In either embodiment, the stroke identification module 206 is adapted for cooperation and communication with the controller 202, the image generator 208, the table generator 210, the data storage 250 and other components of the IBDM server 106.

In one embodiment, the stroke identification module 206 receives form data from one or more forms including handwriting strokes from the controller 202. The stroke identification module 206 identifies pixels in a form image that represent handwriting strokes based on, for example, the pixel intensities, the color of the pixels, etc. The stroke identification module 206 also determines the position (for example, an x-y coordinate) of a stroke in the form image. The stroke identification module 206 identifies the handwriting strokes for a field by a field identifier. In one embodiment, the stroke identification module 206 receives metadata along with the received form image that includes position information of the handwriting strokes in the form image. The stroke identification module 206 identifies the position of each stroke in the form image based on the metadata.

In one embodiment, the stroke identification module 206 receives the completed form data including handwriting strokes (e.g. in InkML or other vector format) from the controller 202. The received form data also includes an unmarked blank form image (i.e., an image of the form without any strokes) as metadata. In another embodiment, the stroke identification module 206 generates completed form data for each completed form from an input completed form image by, for example, subtracting the input completed form image with the unmarked blank form image. The stroke identification module 206 then identifies the position of each stroke within the completed form data and compares it to the known location of the fields in the form.

Referring now to FIG. 3A, a graphic representation of a form image 300 received by the stroke identification module 206 is illustrated. In the illustrated example, the form image 300 includes handwriting strokes filled out on the form 300 by a user using the portable computing device 102. The stroke identification module 206 identifies the strokes, (for example, the strokes that form the letters O 301, s 303, P 305, etc.) from the form image 300 and the position of each stroke in the form images 300.

In one embodiment, the stroke identification module 206 generates a stroke bounding box for a set of handwriting strokes in completed form data. In one embodiment, the stroke identification module 206 identifies handwriting strokes that overlap with each other in the form image based on the position of the strokes and generates the stroke bounding box around the strokes. Each stroke bounding box should be unique and not overlap much with other stroke bounding boxes. The stroke identification module 206 generates the stroke bounding box based on the distance between the strokes in the form image. In this embodiment, the distance between the positions of each stroke is within a threshold distance. For example, the threshold distance is a few millimeters between characters.

In one embodiment, the stroke identification module 206 generates a stroke bounding box for a set of handwriting strokes with x-y coordinates that is relative to the form image on which the set of handwriting strokes are marked. For example, the stroke bounding box is generated including an x-y offset from the upper left corner of the form image to the upper left corner of the stroke bounding box. In another embodiment, the stroke identification module 206 determines a set of handwriting strokes based on their overlap of or proximity to a field (e.g. blank space) in the blank form image. In yet another embodiment, the stroke identification module 206 determines a set of handwriting strokes based on the timing information of the strokes received as metadata with completed form data. For example, the stroke identification module 206 generates a stroke bounding box for a set of handwriting strokes that were filled out at the same time.

Figure 3B:
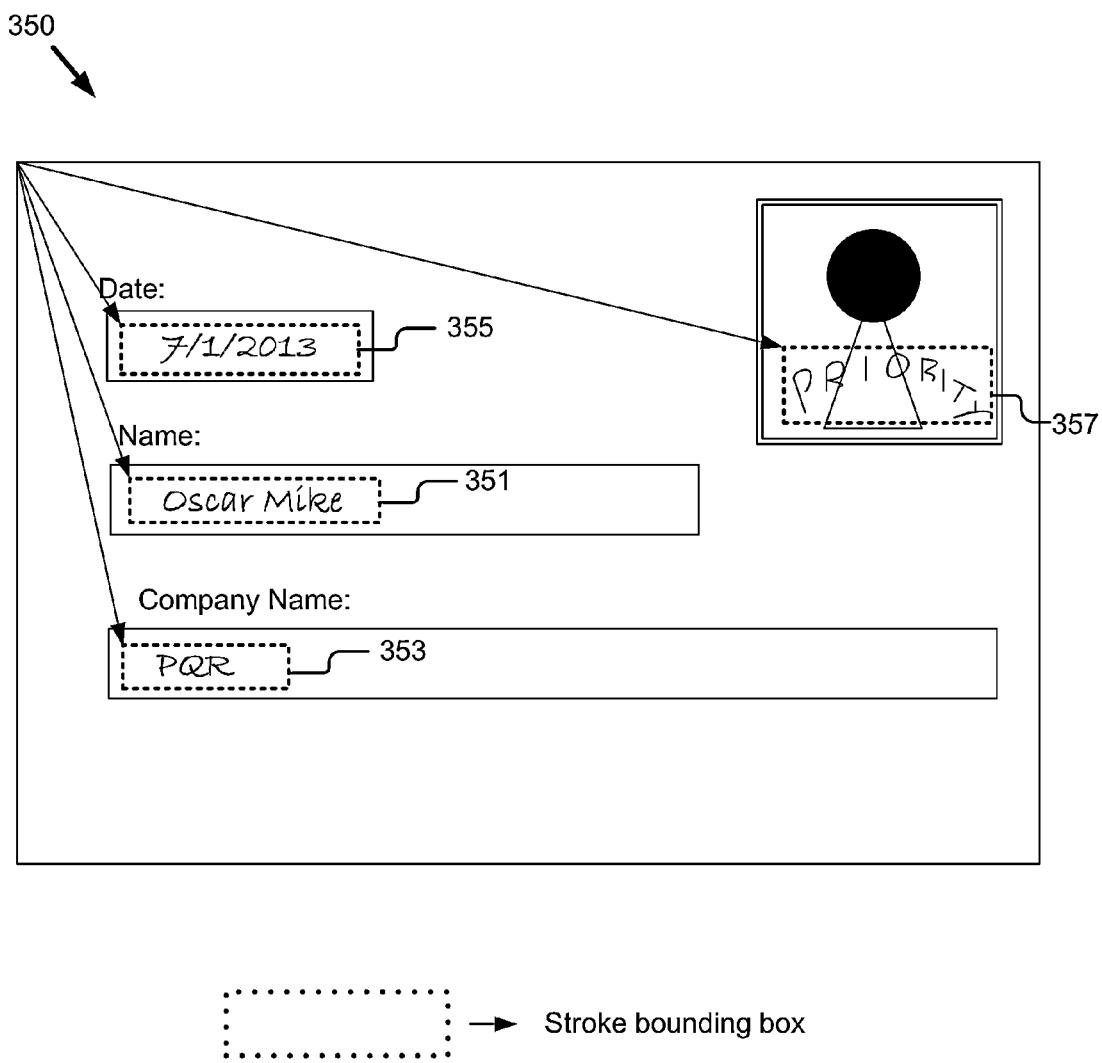
FIG. 3B is a graphic representation of a form image including handwriting strokes that are received by the Image Based Document Management server.

Referring now to FIG. 3B, a graphic representation of a form image 350 including a stroke bounding box generated by the stroke identification module 206 is illustrated. The stroke bounding boxes are illustrated with dotted rectangles. The location of the stroke bounding boxes is illustrated with the solid lines with arrows indicating the beginning of the stroke bounding boxes. In the illustrated example, the stroke identification module 206 generates stroke bounding boxes for the sets of handwriting strokes that form the words "Oscar Mike" 351 and "PQR" 353, the set of strokes that forms the date "7/1/2013" 355 and the set of strokes that forms the words "priority" 357 on top of the photographic image. In one embodiment, the stroke identification module 206 sends the extracted information of the stroke bounding boxes to the image generator 208. In another embodiment, the stroke identification module 206 stores the extracted information of the stroke bounding boxes in the data storage 250. The information is stored in a compressed stroke format known to any person of ordinary skill in the art, including Scalable Vector Graphics (SVG) or Ink Markup Language (InkML).

The image generator 208 is software and routines for generating field images from handwriting fields, symbolic fields and media fields in the completed form data. In one embodiment, the image generator 208 is a set of instructions executable by the processor 240 to provide the functionality described below for generating field images from each form image. In another embodiment, the image generator 208 is stored in the memory 245 and is accessible and executable by the processor 240. In either embodiment, the image generator 208 is adapted for cooperation and communication with the controller 202, the table generator 210, the symbolic representation module 212, the data storage 250 and other components of the IBDM server 106.

The image generator 208 receives information associated with the fields of the one or more form images that is extracted by the form field extraction engine 204 and the stroke identification module 206. In one embodiment, the image generator 208 retrieves the information associated with the fields from the data storage 250. The image generator 208 generates field images based on the information extracted from a combination of handwriting fields, symbolic fields and media fields in the form images. In one embodiment, the image generator 208 generates a field image for symbolic fields based on a drawing primitive saved by the form field extraction engine 204. The drawing primitive that is drawn represents the graphical representation associated with the symbolic fields and any change in the symbolic fields induced by user action (e.g., checking or unchecking a checkbox). The image generator 208 generates, for example, a checked square checkbox, a selected circular radio button, a rectangular name field, ellipse, etc. as field images. In another embodiment, the image generator 208 generates a field image for media fields by rendering media extracted as a drawing primitive by the form field extraction engine 204. The drawing primitive is used to render the media for creating field images. The image generator 208 renders, for example, a photograph of a visitor, a photograph of an expense receipt, an icon that is associated with audio recording of a meeting, etc. as field images. In yet another embodiment, the image generator 208 generates a field image for handwriting fields by rendering handwriting strokes saved as a vector data by the stroke identification module 206. The vector data including color, width and pressure information is used to render the handwriting strokes as field images. The image generator 208, for example, renders a handwritten signature of a user signed using a stylus as a field image.

In one embodiment, the image generator 208 generates field images for both handwriting fields and media fields appearing at the same location on the form images. The image generator 208 generates the field image in such instances by rendering the media first and then rendering the handwriting strokes on top of the media. The image generator 208, for example, renders a photograph of an expense receipt first and then any handwriting strokes marked on top of the photograph of the expense receipt as a field image.

In one embodiment, the image generator 208 generates field images by generating an overlay of completed form data, identifying a group of strokes in each form, identifying a size and a position of a stroke bounding box that encompasses the group of strokes and generating a field image from each of the groups. In another embodiment, the image generator 208 crops the field image from the form image based on the size and the position of the bounding box.

In some embodiments, the image generator 208 generates label images by receiving a field image and the form image associated with the field image, analyzing an area around the field image in the form image to determine a group of related pixels, identifying the group of related pixels as the label for the field image and cropping a label image from an unmarked form image. The process is repeated for all the form images received from the electronic writer server 107. These examples assume that there is only one field and one label in the form image. Persons of ordinary skill in the art will recognize that the process applies to any number of fields and labels in the form image. In another embodiment, the image generator 208 receives information from an administrator about the labels. For example, the administrator annotates a field image with symbolic representations for the labels. In another embodiment, after the table generator 210 generates the table, the administrator defines the labels for each column.

The image generator 208 transmits the field images and the label images, along with any metadata, to the table generator 210. In one embodiment, the image generator 208 stores the field images and the label images, along with any metadata, in data storage 250. In another embodiment, the image generator 208 stores the field images in one or more formats known to any person of ordinary skill in the art, including Scalable Vector Graphics (SVG), Portable Network Graphics (PNG), etc. Field images may have transparent backgrounds (e.g. black or colored strokes on a transparent background for handwriting strokes).

The table generator 210 is software and routines for generating a table associated with a plurality of form images. In one embodiment, the table generator 210 is a set of instructions executable by the processor 240 to provide the functionality described below for generating the table. In another embodiment, the table generator 210 is stored in the memory 245 and is accessible and executable by the processor 240. In either embodiment, the table generator 210 is adapted for cooperation and communication with the processor 240, the image generator 208, the symbolic representation module 212 and other components of the IBDM server 106.

In one embodiment, the table generator 210 receives a request from a user via the controller 201 to view a table. In one embodiment, the table generator 210 receives the field images and optionally label images from the image generator 208 or retrieves the field images and label images from data storage 250 for the purpose of generating a table. In one embodiment, the table generator 210 automatically generates a table by first designating a label image as a column header of the table. If other label images from the same form image are available, the other label images are designated as column headers as well. The table generator 210 then populates the column with field images that are associated with the label image according to the field identifier associated with each field (consequently associated with each field image). In the table generated by the table generator 210, each row represents a completed form and each column is a field image from a particular field (e.g. a particular blank space on the blank form).

In one embodiment, the order of the field images under the column header is determined based on the form identifier associated with the field images. For example, a form identifier associated with a field image can indicate the time entry (time of fill-out) or date of submission associated with the form image that is earlier than another field image in another form image and so the field images are arranged with the first field image appearing above the second field image.

The table generator 210 generates a table that comprises columns organized in different ways. In one embodiment, the label images are placed according to their location in the form image so that the first field in the form image appears before the second field, etc. This is referred to as a reading order. In another embodiment, the table generator 210 places columns that include field images containing unique numbers before other field images. For example, the table generator 210 places field images of social security numbers for the users of the portable computing devices 102 as the first column because it can be used to uniquely identify the user.

In one embodiment, the table generator 210 identifies metadata associated with the form images as symbolic fields and incorporates the field images of such metadata into at least one additional column. For example, the table generator 210 identifies the field images generated by the image generator 208 associated with a timestamp of when the form was filled out or a GPS location where the form was filled out and adds two columns to the table. In another example, the table generator 210 adds a column for timestamp metadata associated with a first stroke input, a last stroke input, etc. on the form images. In one embodiment, the table generator 210 associates the completed form images with the table and instructs the user interface engine 216 to generate a pop-up with the completed form image in response to a user hovering over a field image in a row of the table. The completed form image corresponds to the row of the table. In another embodiment, the pop-up is provided to the user in response to the user selecting a row in the table. In some embodiments, the completed form image is created by drawing field images on top of a blank form image.

In one embodiment, the table generator 210 modifies a view of the table in response to receiving a user preference from the preference module 214, which is discussed in greater detail below. In one embodiment, the table includes a mode of view associated with viewing the table that toggles between images of handwriting strokes and symbolical representations of the images of handwriting strokes based on the user preference. For example, a first mode of view could be a table including images of handwriting strokes, ticked checkboxes, photographs, etc. where the user preference is for image representation (non-symbolic information). In another example, a second mode of view could be a table including symbolic representations of the images of handwriting strokes, symbolic values (text phrase indicating a choice beside a check box) associated with the checkboxes, photographs, etc. where the user preference is for symbolical representations. In a third example, a third mode of view could be a table that includes a blending of images of handwriting strokes and symbolic representations of the images of handwriting strokes because the user preference is for symbolical representation and only certain images of handwriting strokes have been subjected to symbolic conversion by the symbolic representation module 212. In one embodiment, the table generator 210 replaces the symbolic representation of the images of handwriting strokes in the table in response to receiving a user edited symbolic representation from the symbolic representation module 212, which is discussed in greater detail below.

In one embodiment, the table generator 210 toggles from the images of handwriting strokes to the symbolical representations of the images of handwriting strokes based on a confidence score associated with the symbolical representation. In one embodiment, the table generator 210 receives the confidence score associated with the field images as metadata from the symbolic representation module 212, which is discussed in greater detail below. The table generator 210 toggles the image of handwriting strokes to symbolical representation if the confidence score of the symbolical representation is above a threshold. For example, field images of handwriting strokes associated with the column "Name" in the table are toggled to the symbolic representations by the table generator 210 if the confidence score is above a threshold indicated by an administrator as 50% confidence.

In one embodiment, the table generator 210 generates a table that includes four types of data for a cell in the table. For example, a cell of the table exists in one of the following data states: an empty value, image data (e.g., field images including handwriting strokes, photograph, graphical representation of a radio button, etc.), symbolic data (field images including symbolic representation of handwriting strokes, symbolic value associated with the radio button, symbolic information extracted from metadata of the form, etc.) or a combination of image and symbolic data (field images including handwriting strokes and symbolic representation of the handwriting strokes).

The symbolic representation module 212 is software and routines for generating symbolic representations for content in the field images associated with the table. In one embodiment, the symbolic representation module 212 is a set of instructions executable by the processor 240 to provide the functionality described below for generating symbolic representations. In another embodiment, the symbolic representation module 212 is stored in the memory 245 and is accessible and executable by the processor 240. In either embodiment, the symbolic representation module 212 is adapted for cooperation and communication with the processor 240, the communication unit 255, the image generator 208, the table generator 210 and other components of the IBDM server 106.

In one embodiment, the symbolic representation module 212 receives the field images from the image generator 208 and/or related symbolic information from the form field extraction engine 204 or vector stroke data from the stroke identification module 206. In another embodiment, the symbolic representation module 212 retrieves the field images and/or related symbolic data or vector stroke data from the data storage 250. The symbolic representation module 210 generates symbolic information (for example, machine encoded text such as universal character set transformation format-8-bit (UTF-8)) for the field image using, for example, Optical Character Recognition (OCR), Optical Mark Recognition (OMR), intelligent character recognition (ICR), handwriting recognition, pattern recognition, interaction with a human-in-the-loop (HITL) system, etc. In another embodiment, the symbolic representation module 212 generates a new image that represents the field image after conversion to symbolic representations and associates the symbolic information and a confidence score associated with it as metadata to the new image. The symbolic representation module 212 then transmits the new image to the table generator 210. In one embodiment, the symbolic representation module 212 may not generate symbolic information for sensitive field images, for example, employee social security numbers. In another example, the symbolic representation module 212 may not perform symbolic conversion for employee names in Japanese Kanji script.

In one embodiment, the symbolic representation module 212 determines whether a state of a first field image is changed due to user action and then generates symbolic information for a second field image. Referring now to FIG. 3C, a graphic representation 375 of a form image including strokes received by the IBDM server 106 is illustrated. In the illustrated example, the symbolic representation module 212 determines whether the field image representing a checkmark box 381 is checked. The symbolic representation module 212 generates a symbolic representation for the field image representing a phone number 383 only if the checkbox 381 is checked, thereby using computing resources efficiently and avoiding the symbolic conversion of non-crucial field images and thus saving time.

In one embodiment, the symbolic representation module 212 receives a request via the controller 202 to convert at least one field (i.e. at least one column) in the table to symbolic representations. In one embodiment, the symbolic representations may not always be accurate and one or more users interacting with the table may wish to change and/or add to the field image or label image including the symbolic representations in the table. For example, a first user may edit the field image including the symbolic representation to represent his/her interpretation and save the edit. A second user may follow the first user and edit the field image including the symbolic representation a second time to represent the second user's interpretation. In another embodiment, the symbolic representation module 212 generates a confidence score for the symbolic representation in the field image that is subject to change by a plurality of users interacting with the table. For example, the symbolic representation module 212 identifies ten users making an edit to the field image including the symbolic representation, determines that six of out of ten users identified the same edit to the field image including the symbolic representation and assigns a 60% confidence score to the field image including the symbolic representation.

In response to any user edits, the symbolic representation module 212 instructs the table generator 210 to update the field images including the symbolic representation and stores the updated field images in the data storage 250. In one embodiment, the symbolic representation module 212 instructs the table generator 210 to incorporate the last edit made to the field images including the symbolic representation by the one or more users. In another embodiment, the user interface engine 216 updates the table with the edited field images including the symbolic information.

In another embodiment, the symbolic representation module 212 is connected to a human-in-the-loop (HITL) system and the symbolic conversion is performed on a separate server by providing the field image to a human user accessing the user device 103 over the network 104 and allowing the human user to select the image including the preferred symbolic representation. The human selected representation is returned to the symbolic representation module 212 which then transmits the new representation to the table generator 210 and data storage 250. For example, the user interacting with the table might want to convert the field images of handwriting strokes associated with the column "Name" in a generated table and can request conversion by connecting to a HITL system like Amazon's® Mechanical Turk system. This makes it easier for the user to request a conversion of just a portion of data (a single column representing data from the same field on all of the form images) in the table instead of the table as a whole, thereby using computing resources efficiently and saving time.

The preference module 214 is software and routines for receiving a user preference for viewing a table. In one embodiment, the preference module 214 is a set of instructions executable by the processor 240 to provide the functionality described below for receiving user preference for viewing of a table. In another embodiment, the preference module 214 is stored in the memory 245 and is accessible and executable by the processor 240. In either embodiment, the preference module 214 is adapted for cooperation and communication with the processor 240, the communication unit 255, the table generator 210 and other components of the IBDM server 106.

In one embodiment, the preference module 214 receives a user preference through the controller 202 from a user interacting with the user device 103. For example, the user indicates a preference to view only field images of handwriting strokes, field images of symbolic fields including graphical representation (checkboxes, radio buttons, ellipse, etc.), field images of media fields (photograph, an icon that links to an audio or video recording, etc.), etc. in the table. In another example, the user indicates a preference to view only field images including symbolic representations of handwriting strokes, field images of symbolic value associated with the symbolic fields (e.g., text phrases indicating a choice beside checkboxes, radio buttons, etc.) and field images of timestamp and location symbolic information associated with the form image. In one embodiment, the preference module 214 stores the user preference in the data storage 250. In another embodiment, the preference module 214 transmits the user preference to the table generator 210 to modify the view of the table and instructs the user interface engine 216 to update the table.

The user interface engine 216 is software including routines for generating graphical data for displaying a user interface that includes a table for viewing a plurality of form images. In one embodiment, the user interface engine 216 is a set of instructions executable by the processor 240 to generate the user interface. In another embodiment, the user interface engine 216 is stored in the memory 245 and is accessible and executable by the processor 240. In either embodiment, the user interface engine 216 is adapted for cooperation and communication with the processor 240 and other components of the IBDM server 106.

In one embodiment, responsive to a user of a user device 103 requesting the user interface, the user interface engine 216 retrieves the table from the table generator 210 or from data storage 250 and generates graphical data for displaying the table. For example, the graphical data could include JSON descriptions and PNG images for the user device 103 to use for rendering the table. In one embodiment, the table is further modified according to a user preference received from the preference module 214 via the controller 202. For example, the user interface engine 216 receives the instructions via the user device 103 associated with changing a view of the table from field images including handwriting strokes to field images including symbolic representations and vice versa. In one embodiment, the user interface engine 216 arranges the rows to include field images from the form image and columns to represent the field images from multiple forms that are associated with a single label image.

In another embodiment, the user interface engine 216 receives a request to edit field images including the symbolic representation in the form data via the controller 202. The user interface engine 216 generates graphical data to represent field images of the original completed form and transmits the graphical data to the user device 103 via the communication unit 255. In one embodiment, the user interface engine 216 then receives the edits from one or more users via the controller 202 and modifies the form data, which is then saved to the data storage 250. For example, the user requests that a field image including handwriting strokes under the column header "Name" be converted to a symbolic representation that the user has interpreted for better understanding. The user interface engine 216 updates the field image to include both handwriting strokes and a symbolic representation. In another embodiment, the user interface engine 216 also receives edits from the user of a user device 103 via the controller 202 of a symbolic representation that had been converted by the symbolic representation module 212 from a field image. The user interface engine 216 updates the information for generating the table to incorporate the user's edits. Graphical representations of these examples are described in greater detail below.

Example User Interfaces

Figure 4A:
FIG. 4A is a graphic representation of an embodiment of a user interface that includes a table with a plurality of form images based on a preference set for field images including handwriting strokes.

Turning now to FIG. 4A, a graphic representation of an embodiment of a user interface 400 is illustrated that includes a plurality of form images in a table. In this graphic representation, the user interface 400 includes a table 401 that is generated from a plurality of form images received by the Image Based Document Management (IBDM) server 106 and in response to the user clicking on the "Spreadsheet" button 415. The table 401 includes field images from the same form image in a row 403 and field images from form images that are associated with the same label image as a column header 405. In one embodiment, label images are used as column headers, such as the "Name" column header 407 in the table 401. The table 401 has a mode of view associated with it and the user toggles the view of the table 401 by clicking on the toggle button 417. The cells in the table 401 include four types of data. For example, a cell of the table exists in one of the following data states: an empty value, image data (e.g., handwriting strokes, photograph, graphical representation of a radio button, etc.), symbolic data (symbolic representation of handwriting strokes, symbolic value associated with the radio button, etc.) or a combination of image and symbolic data. In the illustrated representation, the table 401 is in a mode of view where the user preference is set to "Strokes" as denoted by the toggle button 417. A first cell 409 in the table is empty (no field image); a second cell 411 and a third cell 413 are field images including an image of handwriting strokes.

FIG. 4B is a graphic representation of an embodiment of a user interface 425 that is generated responsive to the user selecting the row 403 in the table 401 and clicking on the "Single Form-Edit" tab 419 in the FIG. 4A. In this graphic representation, the user interface 425 includes a tabular editing window 431 for editing a field image including symbolic representations in the form image represented by the row 403 in the table 401. The tabular editing window 431 includes an "Image" column 433 and a "Symbolic" column 435. The "Image" column 433 lists only field images including handwriting strokes 437, photographs 439 and graphical representation of symbolic fields 441 and associated drawing commands. The "Symbolic" column 435 lists the field images including the symbolic representation of handwriting strokes 443, symbolic value associated with the symbolic fields 445 and symbolic information 447 associated with the metadata of the form image. In one embodiment, the user can tap a first field image under the "Symbolic" column 435 that corresponds to a second field image under the "Image" column 433 to edit the first field image including the symbolic representation. The change in the first field image including the symbolic representation is updated in the table 401 in FIG. 4A.

Figure 4C:
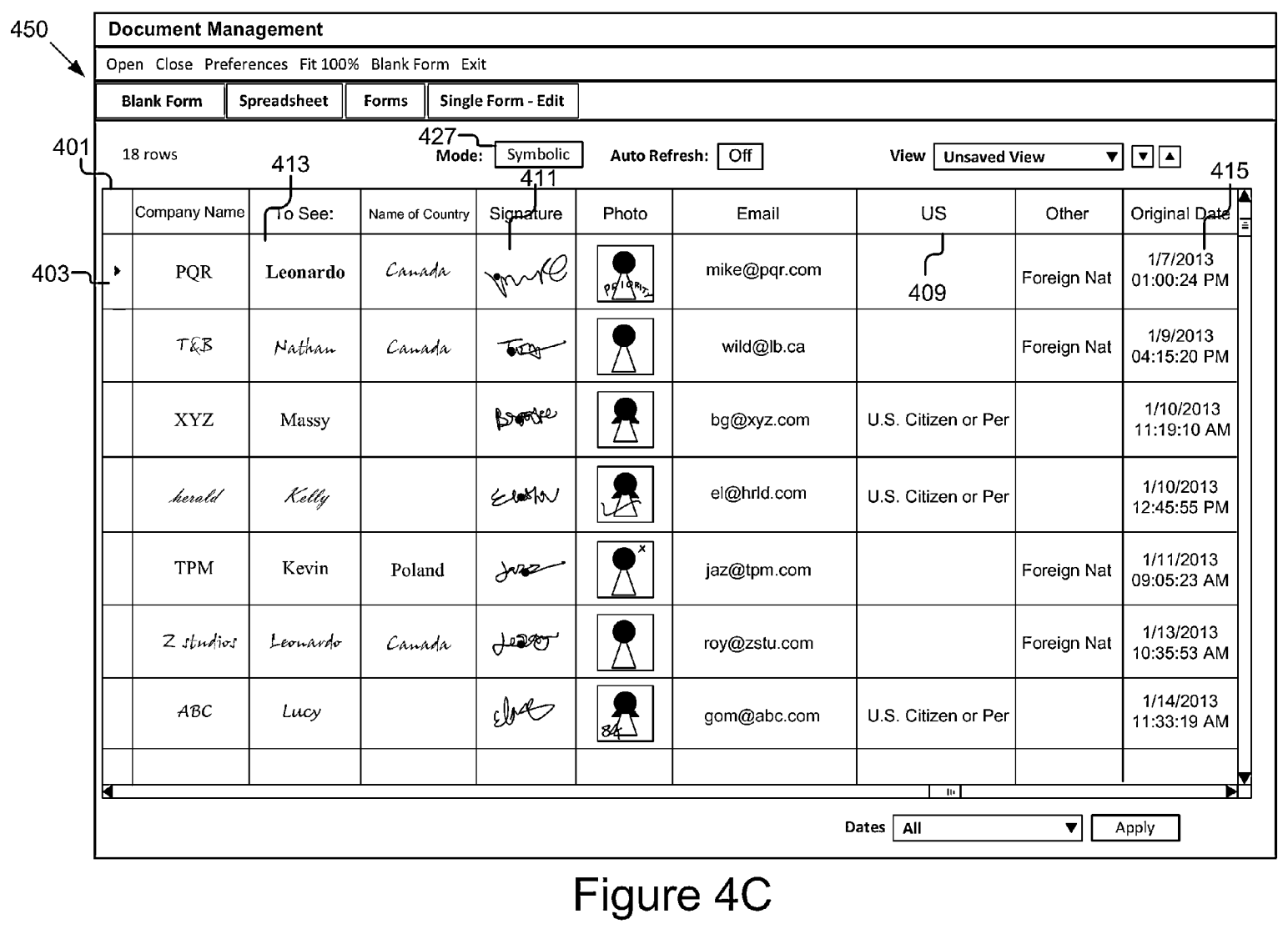

FIG. 4C is a graphic representation of an embodiment of a user interface 450 that is generated responsive to the user setting the preference to "Symbolic" by selecting the toggle button for symbolic mode 427. In this graphic representation, the user interface 450 includes the table 401 with the first cell 409 and the second cell 411 remaining unchanged from FIG. 4A because these cells do not contain symbolic data. The user interface 450 illustrates that the first cell 409 is an "empty"

cell and the second cell 411 is an "image data" cell in the table 401. The user interface 450 displays the third cell 413 including a field image of symbolic representation and illustrates that the third cell 413 includes a combination of "image and symbolic data". In addition, the user interface 450 also includes a fourth cell 415 including a field image of symbolic information extracted from metadata of the form. For example, secondary information such as a timestamp "Original Date" when the form was filled out can be attached to the form image as metadata and represented in the table 401 as a column. This information is represented symbolically because the table generator 210 extracted the information from the metadata and not information input by a user of the portable computing device 102 using the stylus. Thus, the fourth cell 415 is a "symbolic data" cell.

Methods

Figure 5A:
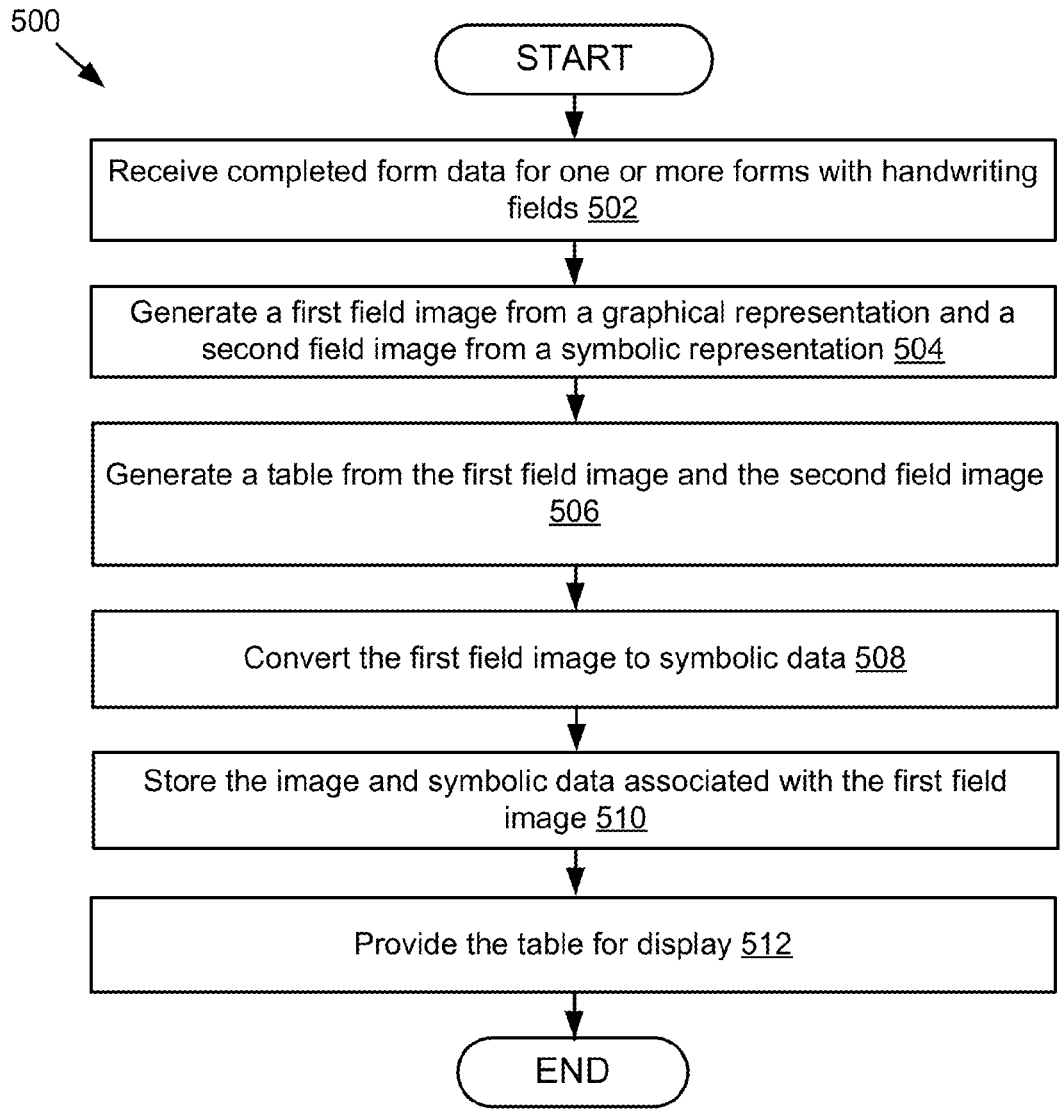
FIG. 5A is a flow diagram of one embodiment of a method for creating a table from form images.
Figure 5B:
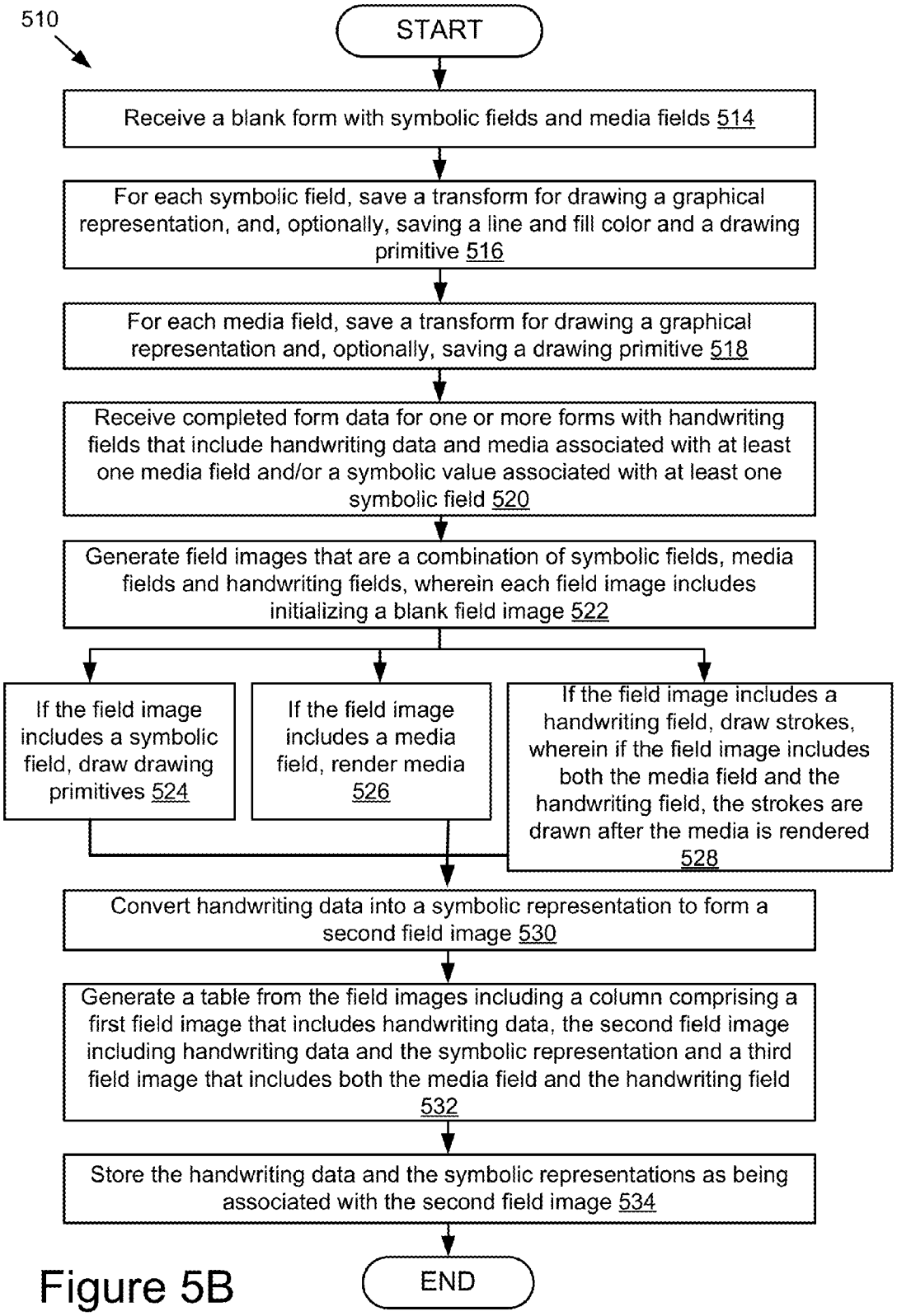
FIG. 5B is a flow diagram of another embodiment of a method for creating a table from form images.
Figure 6:
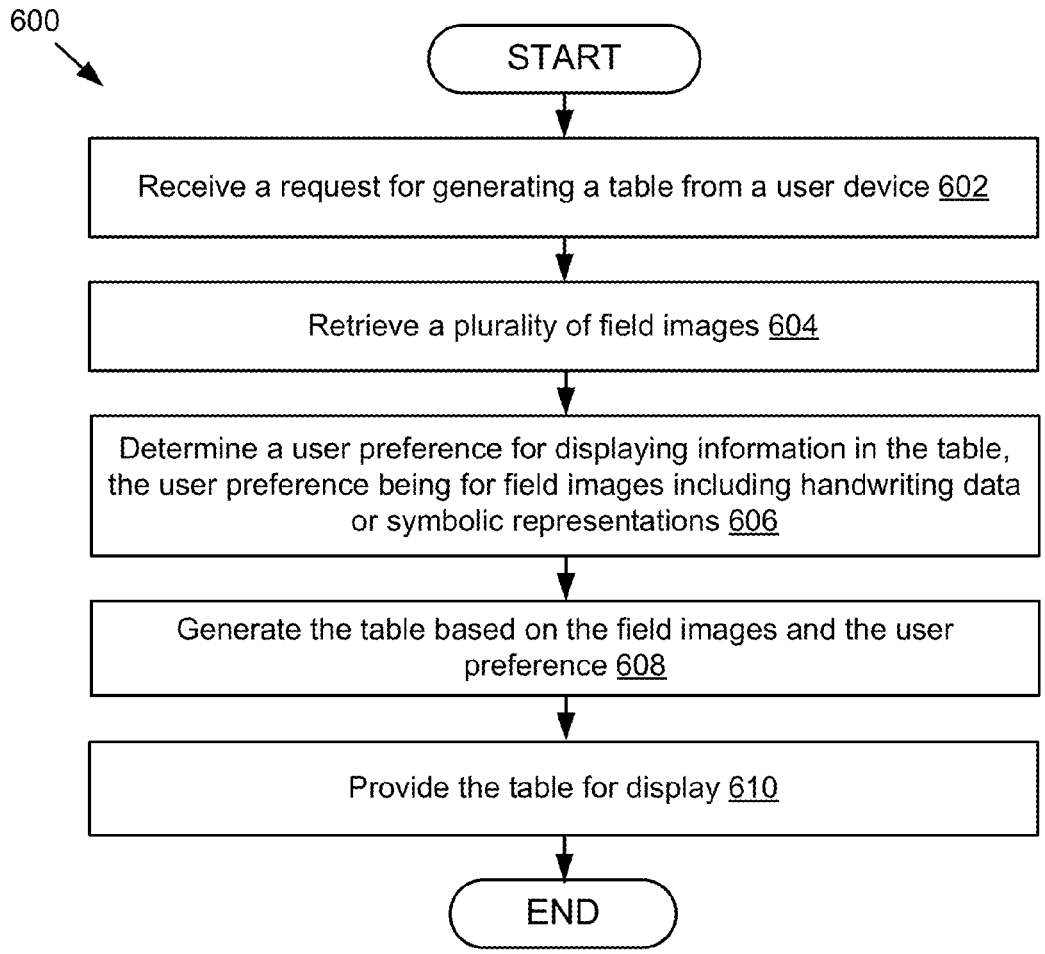
FIG. 6 is a flow diagram of one embodiment of displaying user preferences for a table.

Referring now to FIGS. 5A, 5B and 6, various embodiments of the methods of the invention will be described. FIG. 5A is a flow diagram 500 of an embodiment of a method for creating a table from form images. The IBDM server 106 includes a form field extraction engine 204, an image generator 208, a table generator 210 and a symbolic representation module 212. The form field extraction engine 204 receives 502 completed form data for one or more forms with handwriting fields. The image generator 208 generates 504 a first field image from a graphical representation and a second field image from a symbolic representation. The table generator 210 generates 506 a table from the first field image and the second field image. The symbolic representation module 212 converts 508 the first field image to symbolic data. The image and symbolic data associated with the first field image is stored 510 in the data storage 250. The table generator 210 provides 512 the table for display via the communication unit 255.

FIG. 5B is a flow diagram 510 of an embodiment of a method for creating a table from form images. The IBDM server 106 includes a form field extraction engine 204, a stroke identification module 206, an image generator 208, a table generator 210 and a symbolic representation module 212. In one embodiment, the form field extraction engine 204 receives 514 a blank form with symbolic fields and media fields. The blank form corresponds to one or more completed forms that are received from the electronic writer server 107. For example, a large multinational business receives a large number of visitors who fill out a "Visitor Registration" form, a hospital receives a large number of patients who fill out a "Patient Medical History" form, etc. The form field extraction engine 204 saves 516 a transform for each symbolic field in the blank form for drawing a graphical representation, for example, an image of a checkbox, a rectangular field for inputting name, dotted line, etc. The form field extraction engine 204 optionally saves a line and fill color and a drawing primitive for each symbolic field. The form field extraction engine 204 saves 518 a transform for drawing a graphical representation for each media field, for example, a square box where media, such as, a photograph is placed on the form image. The form field extraction engine 204 optionally saves a drawing primitive (e.g., segments of straight lines, curves, spheres, etc.) for each media field.

In one embodiment, the stroke identification module 206 receives 520 completed form data for one or more forms with handwriting fields that include handwriting data and media associated with at least one media field and/or a symbolic value associated with at least one symbolic field. The symbolic values include, for example, a text phrase beside a checkbox indicating a choice, timestamp metadata associated with the form image (time and/or original date of fill out), timestamp metadata for stroke input (e.g., first stroke, median stroke, last stroke, etc.) and location metadata (e.g., GPS) where the form was submitted, etc. The image generator 208 generates 522 field images that are a combination of symbolic fields, media fields and handwriting fields, wherein each field image includes initializing a blank field image. For example, the handwriting fields include handwriting data, for example, writing, drawing and/or marking with strokes by a user. The symbolic fields include symbolic data, for example, a graphical representation of a check box, a symbolic representation of a choice (e.g., a text phrase, such as, "True", "False", etc. beside a check box). The media fields include media data captured by a portable computing device 102 or media data saved on the storage of the portable computing device 102 that is used in the form, for example, a photograph, an audio recording, a video recording, etc. In one embodiment, the handwriting fields and the media fields can both appear at the same location. For example, a user may mark strokes on top of a photograph in a form image.

The image generator 208 draws 524 drawing primitives if the field image includes a symbolic field, renders 526 media if the field image includes a media field and draws 528 strokes if the field image includes a handwriting field. If field image includes both the media field and the handwriting field, the strokes are drawn after the media is rendered by the image generator 208. In one example, the field images for the symbolic field include the graphical representation associated with the symbolic field and any change in the symbolic field induced by user action (e.g., a checked square checkbox, a selected circular radio button, etc.). In another example, the field images for the media field include rendering the media (e.g., a photograph of a visitor, etc.). In a third example, the field images for the handwriting field include rendering the handwriting strokes (e.g., Name, Signature, etc.) based on vector data saved by the stroke identification module 206. Lastly, the field images for the handwriting field and the media field appearing at the same location include rendering the media (e.g., a photograph of an expense receipt) first and then rendering the handwriting strokes (e.g., "priority" written on the photograph) on top of the media.

The symbolic representation module 212 converts 530 handwriting data into symbolic representations to form a second field image. In one embodiment, the symbolic representation module 212 receives a first field image including the handwriting data and generates the second field image including the symbolic representation for the handwriting data. The symbolic representation module 210 generates symbolic information (for example, machine encoded text such as universal character set transformation format-8-bit (UTF-8)) for the field image using, for example, Optical Character Recognition (OCR), Optical Mark Recognition (OMR), intelligent character recognition (ICR), handwriting recognition, pattern recognition, interaction with a Human-in-the-loop (HITL) system, etc. Field images of symbolic representations can also be created from a symbolic value.

The table generator 210 generates 532 a table from the field images including a column comprising a first field image including the handwriting field, the second field image including the symbolic representation and a third field image that includes both the media field and the handwriting field. The symbolic value, for example, includes secondary information such as a timestamp "Original Date" when the form was filled out can be attached to the form image as metadata. This information is represented symbolically as a field image because the table generator 210 extracted the information from the metadata and not information input by a user of the portable computing device 102 using the stylus. The table generator 210 stores 534 the handwriting data and the symbolic representations as being associated with the second field image. For example, a cell under the column "Name" in the table 401 in FIG. 4A can include both field images of handwriting data and symbolic representations.

FIG. 6 is a flow diagram 600 that illustrates another embodiment of a method for creating a table from form images. The IBDM server 106 includes a table generator 210 and a preference module 214. The table generator 210 receives 602 a request for generating a table from a user device 103 and retrieves 604 a plurality of field images. In one embodiment, the table generator 210 determines an order of the entry of the field images based on a form identifier associated with the field images. The preference module 214 determines 606 a user preference for displaying information in the table, the user preference being for field images including handwriting data or field images including symbolic representations. For example, the user can indicate a preference to view only field images of handwriting strokes, field images of symbolic fields including graphical representation (checkboxes, radio buttons, ellipse, etc.), field images of media fields (photograph, an icon that links to an audio or video recording, etc.), etc. in the table. In another example, the user can indicate a preference to view only field images including symbolic representations of handwriting strokes, field images of symbolic value associated with the symbolic fields (e.g., text phrases indicating a choice beside checkboxes, radio buttons, etc.) and field images of timestamp and location symbolic information associated with the form image. The table generator 210 generates 608 the table based on the field images and the user preference. The user interface engine 216 then generates graphical data for displaying the table and provides 610 the table for display to the user device 103 via the communication unit 255. In one embodiment, the table is generated in reading order of any one form image since the layout of the form image is common across the plurality of form images. The reading order is determined based on the metadata, which includes a timestamp for when users entered stroke information into each field. In another embodiment, the table comprises at least one row of the table representing a form image from the plurality of form images and with at least one column of the table representing at least one field image associated with the at least one column from the plurality of form images.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving a blank form with a plurality of fields including a symbolic field, a handwriting field, and a media field;
for each field of the symbolic field and the media field, saving a transform and a drawing primitive for drawing a graphical representation of field contents;
receiving completed form data for one or more forms, the form data including symbolic data, handwriting data, and media associated with the symbolic field, the handwriting field, and the media field;
generating a first field image for the handwriting field having associated handwriting data from a graphical representation of the associated handwriting data and a second field image from a symbolic representation of the associated handwriting data;
generating a third field image for the media field having associated media data by rendering the media;
generating a fourth field image for the symbolic field having associated symbolic data from a graphical representation of the symbolic data;
generating a table from the first field image, the second field image, the third field image, and the fourth field image; and
providing the table for display.

2. The method of claim 1, wherein if the third field image includes both media data and handwriting data, the handwriting strokes are drawn after the media is rendered.

3. The method of claim 1 further comprising:
converting the handwriting data to the symbolic representation; and
storing the handwriting data and the symbolic representation associated with the first field image.

4. The method of claim 3, further comprising:
determining a user preference for displaying the table, the user preference being for field images including handwriting data or field images including symbolic representations;
generating the table based on the user preference; and
providing the table for display to the user device.

5. The method of claim 4, wherein generating the table based on the user preference comprises:
determining a confidence score associated with the field images including symbolic representations;
identifying whether the confidence score is above a threshold; and
generating the table based on the user preference for field images including symbolic representations responsive to the confidence score being above the threshold.

6. The method of claim 1, wherein the completed form data for one or more forms includes media comprising at least one of a photograph, an icon that links to an audio or video recording and a thumbnail.

7. The method of claim 1, wherein the completed form data for one or more forms includes at least one symbolic field comprising at least one of a text phrase indicating a choice, a timestamp associated with a form image, a timestamp associated with stroke input on the form image and a location where the form image was filled out.

8. A system comprising:
a processor;
a form field extraction engine stored on a memory and executable by the processor, the form field extraction engine configured to:
receive a blank form with a plurality of fields including a symbolic field, a handwriting field, and a media field and extract a background image; and
receive completed form data for one or more forms including symbolic data and media data associated with the symbolic field and the media field and for each of the symbolic field and the media field, save a transform and a drawing primitive for drawing a graphical representation of field contents;
a stroke identification module stored on the memory and executable by the processor, the stroke identification module configured to receive completed form data for one or more forms including handwriting data associated with the handwriting field and save handwriting strokes from the handwriting data;
an image generator stored on the memory and executable by the processor, the image generator coupled to the stroke identification module and the form field extraction engine, the image generator configured to:
generate a first field image for the handwriting field having associated handwriting data from a graphical representation of the associated handwriting data and a second field image from a symbolic representation of the associated handwriting data;
generate a third field image for the media field having associated media data by rendering the media; and
generate a fourth field image for the symbolic field having associated symbolic data from graphical representation of the symbolic field data; and
a table generator stored on the memory and executable by the processor, the table generator coupled to the image generator and configured to generate a table from the first field image, the second field image, the third field image, and the fourth field image and provide the table for display.

9. The system of claim 8, further comprising:
wherein if the third field image includes both media data and the handwriting data, the image generator is configured to draw the handwriting strokes after the media is rendered.

10. The system of claim 8, further comprising:
a symbolic representation module that is coupled to the table generator, the symbolic representation module for converting the handwriting data to the symbolic representation; and
a database for storing the handwriting data and the symbolic representation associated with the first field image.

11. The system of claim 10, further comprising:
a user preference module that is coupled to the table generator, the user preference module configured to determine a user preference for displaying the table, the user preference being for field images including handwriting data or field images including symbolic representations; and
wherein the table generator is configured to generate the table based on the user preference and to provide the table for display to the user device.

12. The system of claim 10, wherein the table generator generates the table based on the user preference by determining a confidence score associated with the field images including symbolic representations, identifying whether the confidence score is above a threshold and generating the table based on the user preference for field images including symbolic representations responsive to the confidence score being above the threshold.

13. The system of claim 8, wherein the completed form data for the one or more forms includes media comprising at least one of a photograph, an icon that links to an audio or video recording and a thumbnail.

14. A computer program product comprising a useable medium including a non-transitory computer readable program, wherein the computer readable program when executed on a computer causes the computer to:
receive a blank form with a plurality of fields including a symbolic field, a handwriting field, and a media field;
for each field of the symbolic field and the media field, save a transform and a drawing primitive for drawing a graphical representation of field contents;
receive completed form data for one or more forms, the form data including symbolic data, handwriting data, and media associated with the symbolic field, the handwriting field, and the media field;
generate a first field image for a handwriting field having associated handwriting data from a graphical representation of the associated handwriting data and a second field image from a symbolic representation of the associated handwriting data;
generate a third field image for the media field having associated media data by rendering the media;
generate a fourth field image for the symbolic field having associated symbolic data from a graphical representation of the symbolic data;
generate a table from the first field image, the second field image, the third field image, and the fourth field image; and
provide the table for display.

15. The computer program product of claim 14 wherein if the third field image includes both the media field and the handwriting field, the strokes are drawn after the media is rendered.

16. The computer program product of claim 14, further comprising:
converting the handwriting data to the symbolic representation; and
storing the handwriting data and the symbolic representation associated with the first field image.

17. The computer program product of claim 16, wherein the step to generate the table based on the user preference further comprises:
determine a confidence score associated with the field images including symbolic representations;
identify whether the confidence score is above a threshold; and
generate the table based on the user preference for field images including symbolic representations responsive to the confidence score being above the threshold.

18. The computer program product of claim 14, further comprising:
determining a user preference for displaying the table, the user preference being for field images including handwriting data or field images including symbolic representations;
generating the table based on the user preference; and
providing the table for display to the user device.

19. The computer program product of claim 14, wherein the completed form data for the one or more forms comprises at least one of a photograph, an icon that links to an audio or video recording and a thumbnail.

20. The computer program product of claim 14, wherein the completed form data for one or more forms includes at least one symbolic field comprising at least one of a text phrase indicating a choice, a timestamp associated with a form image, a timestamp associated with stroke input on the form image and a location where the form image was filled out.

\* \* \* \* \*